United States Patent
Davies et al.

(10) Patent No.: US 9,780,402 B2
(45) Date of Patent: Oct. 3, 2017

(54) METHOD OF ASSEMBLING A BIPOLAR BATTERY

(75) Inventors: Gavin Davies, Abertillery (GB); Allan Turtle, Abertillery (GB)

(73) Assignee: Atraverda Limited, Abertillery (GB)

( * ) Notice: Subject to any disclaimer, the term of this patent is extended or adjusted under 35 U.S.C. 154(b) by 1505 days.

(21) Appl. No.: 13/381,719

(22) PCT Filed: Jun. 30, 2010

(86) PCT No.: PCT/GB2010/001272
§ 371 (c)(1),
(2), (4) Date: Mar. 12, 2012

(87) PCT Pub. No.: WO2011/001148
PCT Pub. Date: Jan. 6, 2011

(65) Prior Publication Data
US 2012/0156559 A1    Jun. 21, 2012

(30) Foreign Application Priority Data
Jul. 3, 2009   (GB) .................................. 0911615.3

(51) Int. Cl.
| | |
|---|---|
| *H01M 2/08* | (2006.01) |
| *H01M 10/04* | (2006.01) |
| *H01M 2/02* | (2006.01) |
| *H01M 10/12* | (2006.01) |
| *H01M 10/18* | (2006.01) |
| *H01M 10/28* | (2006.01) |

(52) U.S. Cl.
CPC ..... *H01M 10/0418* (2013.01); *H01M 2/0247* (2013.01); *H01M 2/08* (2013.01); *H01M 10/044* (2013.01); *H01M 10/127* (2013.01); *H01M 10/18* (2013.01); *H01M 10/282* (2013.01); *H01M 2/0295* (2013.01)

(58) Field of Classification Search
None
See application file for complete search history.

(56) References Cited

U.S. PATENT DOCUMENTS

| | | | |
|---|---|---|---|
| 5,326,656 A | 7/1994 | Meadows et al. | |
| 5,682,671 A | 11/1997 | Lund et al. | |
| 2003/0235756 A1* | 12/2003 | McCarley ............... | H01M 2/08 429/185 |
| 2008/0138706 A1 | 6/2008 | Takayama et al. | |

FOREIGN PATENT DOCUMENTS

| | | |
|---|---|---|
| CA | 789656 A | 7/1968 |
| CN | 101202365 A | 6/2008 |

OTHER PUBLICATIONS

International Search Report and Written Opinion, PCT/GB2010/001272, dated Aug. 18, 2010, 10 pages.
Great Britain Search Report, GB0911615.3, dated Aug. 27, 2009, 5 pages.

\* cited by examiner

*Primary Examiner* — Ula C Ruddock
*Assistant Examiner* — Frank Chernow
(74) *Attorney, Agent, or Firm* — Senniger Powers LLP

(57) ABSTRACT

A method of sealing together two elements of a bipolar battery, the method comprising: interposing an inductive heating element between the two elements; applying a current to the inductive heating element to generate localized heat to melt material in the vicinity of the heating element to seal the two elements together.

17 Claims, 4 Drawing Sheets

METHOD OF ASSEMBLING A BIPOLAR BATTERY

REFERENCE TO RELATED APPLICATIONS

Figure 1:
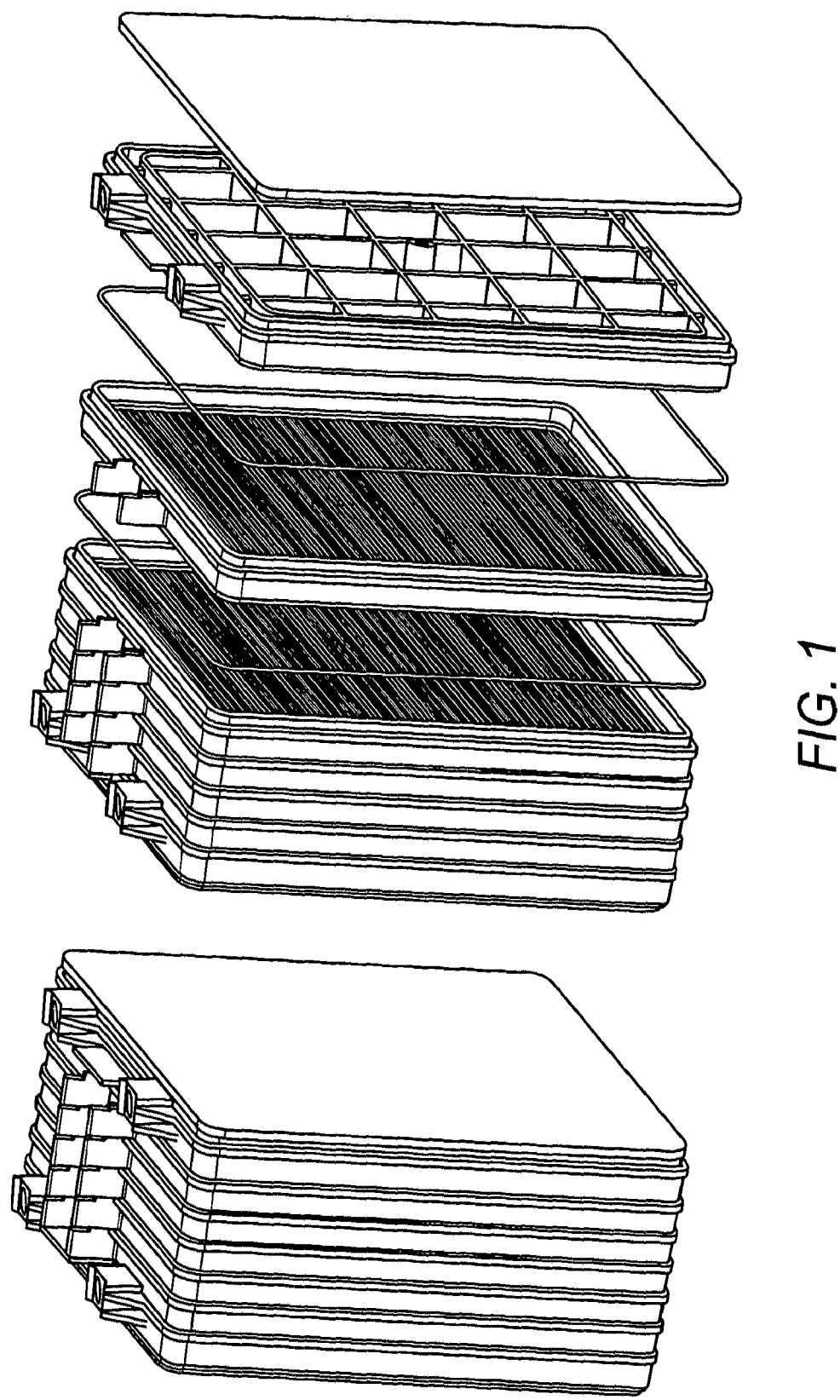

This application is the U.S. national stage application of International Patent Application No. PCT/GB2010/001272, filed Jun. 30, 2010, and claims the benefit of Great Britain Application No. 0911615.3, filed Jul. 3, 2009, the entire disclosures of which are incorporated herein by reference.

The invention relates to a method of sealing together two elements of a bipolar battery. In particular, the invention relates to a method of sealing together two frame elements which each support a bipolar electrode for use in a bipolar battery. The invention also relates to a method of sealing together a bipolar substrate and a frame for supporting a bipolar electrode for use in a bipolar battery. The present invention also relates to a bipolar battery.

Bipolar batteries are known in the art. The batteries comprise a plurality or assembly of bipolar substrates connected in series. At one end of the assembly of bipolar substrates is a positive monopole. At the other end of the assembly of bipolar substrates is the negative monopole. The bipolar substrate comprises an electrode. In the case of a bipolar lead-acid battery each electrode, except the monopoles at each end, has one side of the electrode covered with porous lead, which is the negative side of the bi-polar electrode, and the other side (the positive), covered with porous lead dioxide. The electrodes may formed from, for example, Ebonex™ ceramic. Optionally a thin layer of metal is applied to the electrode before the paste is applied. In use, current passes through the electrodes perpendicular to the electrode surfaces at uniform current density.

Typically the bipolar substrates are held together in a plastic framework. Sealing the bipolar substrates is achieved in the laboratory by the use of gaskets of appropriate thickness and made from, for example, butyl, silicone or thermoplastic elastomer rubber sheet. The entire assembly is held together by metal straps and bolts of suitable length. In a commercial battery typically the substrates are sealed into a pre-moulded plastic container having slots for each substrate. The battery is then electrically formed in the usual way (see for example International patent application no. PCT/GB2006/001504).

It is one of the objects of the present invention to provide an improved method of fabricating or assembling a battery.

The present inventors have found that assemblies of bipolar substrates may be joined together by supporting each bipolar substrate into a plastic frame. The plastic frames are then joined and sealed together using adhesive.

However, this method has a number of limitations. Firstly, it is vital to ensure that enough adhesive is used to form a complete seal around the frames. Upon compression of the frames together, some adhesive is forced out from the join and onto the surface of the formed assembly. This unsightly adhesive is then removed in a further cleaning step to form the assembled bipolar substrates and the battery. A further disadvantage of this method is that adhesive is expensive.

It is important that the plastic frames containing the bipolar substrates are sealed together in an air tight manner. The introduction of air into the battery can lead to electrical self-discharge. Moreover, it is important that the battery is sealed so that the acid electrolyte can be added between the bipolar electrodes.

Previously, the bipolar substrate itself has been sealed in to the frame using adhesive. This has similar disadvantages to those outline above, i.e. it is vital to ensure that enough adhesive is used to form a complete seal between the substrate and the frame. Excess adhesive must be removed in a further cleaning step to form the assembled bipolar substrates and the frames. A further disadvantage of this method is that adhesive is expensive.

In a first aspect of the present invention there is provided a method of sealing together two elements of a bipolar battery, the method comprising:
  interposing an inductive heating element between the two elements;
  applying a current to the inductive heating element to generate localised heat to melt material in the vicinity of the heating element to seal the two elements together.

In one embodiment of the present invention there is provided a method of sealing together two frame elements which each support a bipolar electrode for use in a bipolar battery, the method comprising:
  interposing an inductive heating element between the two frame elements;
  applying a current to the inductive heating element to generate localised heat to melt material in the vicinity of the heating element to seal the two frames together.

In a second aspect of the present invention there is provided a bipolar battery comprising a plurality of elements welded together by inductive heating.

In one embodiment there is provided a bipolar battery comprising a plurality of frame elements welded together by inductive heating.

The inductive heating element may be a separate component from either of the two elements of the bipolar battery to be sealed together, for example from either of the two frame elements. Alternatively, or additionally, the inductive heating element may form an integral part of at least one of the two elements of the bipolar battery to be sealed together, for example a frame element. The inductive heating element may be fashioned from a single continuous piece or in the case of a wire is joined into a loop by spot welding or twisting of the two wire ends together. The two ends of such a wire may be joined together for example by cold forging or laser welding. The inductive heating element may be fashioned from multiple pieces which are arranged such that they are in contact with each other to allow electrical current to flow around the whole element.

The inductive heating element may be placed on each of the two elements (preferably frame elements) to be sealed together. Alternatively, a single heating element may be used to seal the two elements together, preferably frame elements.

Any suitable inductive heating element may be used.

The inductive heating element may comprise one or more metals, preferably a ferromagnetic material. The metal may comprise one or more of iron, steel, copper, lead, tin and aluminum. The metal may comprise an alloy.

More preferably the inductive heating element comprises carbon steel. More preferably still the inductive heating element comprises lead. Lead is particularly preferred because if it comes into contact with the battery electrolyte, it will not contaminate it. Lead is also easy to shape and join together.

The inductive heating element may comprise plastic doped with ferromagnetic ceramic.

The inductive heating element may be in the form of a wire, flat metal strips, or suitably doped polymer rope. The present inventors have found that using metal wire is the most economical method of carrying out the present invention.

It will be understood that different thicknesses of wire may be used. Preferably the wire has a thickness of from 2 cm to 0.1 mm, more preferably from 1.2 cm to 0.5 mm or from 1 cm to 0.5 mm, most preferably the wire has a diameter of 1 mm or 0.8 mm.

Preferably the inductive heating element comprises carbon steel wire having a 0.8 mm diameter. Such wire is commercially available.

More preferably the inductive heating element comprises lead wire having an approximately 1 mm diameter. Such wire is commercially available.

The two elements of the bipolar battery to be sealed together may be two frame elements which each support a bipolar electrode for use in a bipolar battery. Alternatively, or additionally, one of the elements to be sealed together may be a bipolar substrate and the other element may be a frame for supporting a bipolar electrode for use in a bipolar battery.

It will be understood that the method of the present invention may be used to either seal a bipolar substrate and frame together by inductive means, followed by sealing together two frame elements which each support a bipolar electrode for use in a bipolar battery. Alternatively, the sealing of these components may be carried out simultaneously.

Preferably the two elements to be sealed together (for example two frame elements) have an interlocking configuration. This is preferable as it aids the elements (for example frames) being held together and helps to ensure that an air-tight seal is formed between the elements (for example frames). Typically when two frames are sealed together the frames have complimentary tongue and groove configurations on each side of the frame, so that two adjacent frames may interlock with one another. When a substrate and a frame is sealed together the substrate and the frame may also be designed to have complimentary tongue and groove configurations, so that they may interlock with one another.

In one embodiment of the present invention the material which is melted by the inductive heating element forms an integral part of at least one of the two elements of the bipolar battery to be sealed together.

In another embodiment, the material which is melted by the inductive heating element comprises a material which is an initially separate component from either of the two elements of the bipolar battery to be sealed together (for example two frame elements). The additional material may be considered as a sacrificial material, which is added to the element, for example a frame. This material will be chosen to have a suitable melting temperature so that it can be melting by the chosen inductive heating means. Preferably this material comprises a thermoplastic material.

The material which is melted by the inductive heating element may comprise a different material to the bulk of the element, for example the frame element, or it may comprise the same material as the bulk of the element.

Preferably when the two elements to be sealed together are frame elements, the frame elements are subjected to a compression force in the range of from 0.2 to 8 bar, more preferably from 1 to 3 bar. More preferably, the frame elements are subjected to a compression force in the range of from 0.5 to 3 bar, more preferably from 1 to 2 bar. Using compression whilst the frames are induction welded together helps to ensure that the frames are sealed together in an air tight manner.

Preferably when the two elements to be sealed together are a bipolar substrate and a frame, the two elements are subjected to a compression force in the range of from 0.2 to 8 bar. More preferably, the two elements are subjected to a compression force in the range of from 0.5 to 3 bar, more preferably from 1 to 2 bar. Using compression whilst the bipolar substrate and the frame are induction welded together helps to ensure that the two elements are sealed together in an air tight manner.

Preferably at least one of the elements to be sealed to together comprises a thermoplastic material. Preferably at least one of the elements comprises acrylonitrile butadiene styrene, polyethylene, polypropylene, acrylonitrile butadiene styrene/polycarbonate or their blends. When the element is a frame element, preferably it also comprises glass fiber, which strengths the frame.

Preferably, the inductive heating element surrounds the whole frame such that an air tight seal is formed upon heating.

Current may be applied to the inductive heating element by surrounding the frames with an induction coil. The coil is then connected to an induction generator. For example a TruHeat® HF 1005 (5-450) may be used as an induction generator.

One induction coil may be used to weld the elements (for example frames) together. Typically, a plurality of elements (for example frames) will be welded together in one session. The coil may be automated and controlled to move along the stack of elements (for example frames), sealing them to one another. Alternatively, multiple induction coils may be used, so that multiple elements (for example frames) are sealed together at once, without the need to move the coil relative to the frames, (or vice versa).

The present inventors have found that preferably using low frequency/current for a given time provides the best results. For example, a frequency range of 100 to 300, 100 to 275 kHz, preferably 150 to 250 kHz and current of 10 to 30 Amps, preferably 12 to 20 Amps. Suitable conditions include 200 kHz/15 Amps for two seconds per seal.

The present inventors have found that using high frequencies (for example above 300 kHz, above 325 kHz, or above 350 kHz) in the method of sealing together two elements is disadvantageous. This is because at high frequencies the electromagnetic field penetrates deep into the battery stack, and has adverse effects on the bipolar electrodes. For example, experiments have shown that using high frequencies to seal two frames together adversely affects the lead foil part of the substrate present in the bipolar electrode. Such disadvantageous effects can be reduced or mitigated by using low frequencies.

Without wishing to be bound by any particular theory it is thought that using low frequency induction welding (i.e. 300 kHz or below, preferably less than 275 kHz, or less than 250 kHz) produces dual heating (Eddy currents) where resistance in the heating element generates heat. High frequency induction welding produces hysteresis heating which results in magnetic hysteresis loss to generate heat.

The inventors have found that when high frequencies and currents (for example above 300 kHz, or above 350 kHz and 30 Amps) are used on frames comprising acrylonitrile butadiene styrene, distortion of the frames was observed. Moreover, if a metallic foil was present on the bipolar electrode, care needs to be taken to reduce or avoid blistering of the foil caused by the heat generated by the induction heating.

If the settings of the induction coil are too low not enough heat is generated to form a seal between two elements (for example frames). If the settings are two high, as outlined above, the frames may distort, and/or any materials present in or on the electrode may be damaged.

The settings of the induction coil are therefore chosen to heat the frame sufficiently to ensure welding of the two components together, without damaging the substrate, frame, or its contents.

The settings which have been found to be of particular use are: 17.5 Amps, giving a frequency of 175 KHz for a time of 2 seconds per seal.

Other settings which have been found to be of particular use are: 15 Amps, giving a frequency of 200 KHz for a time of 2 seconds per seal.

The present invention also comprises a bipolar battery comprising a plurality of elements welded together by inductive heating. The bipolar battery may comprise a plurality of frame elements which each support a bipolar electrode welded together by inductive heating and/or it may comprise a plurality of bipolar substrates and frame elements welded together by inductive heating.

In one embodiment, the present invention comprises a bipolar battery comprising a plurality of frame elements welded together by inductive heating.

Preferably the frame elements each support a bipolar electrode. The bipolar electrode is preferably coated with a negative paste on one side of the electrode (typically porous lead), and a positive paste on the other side of the electrode (typically porous lead dioxide) for use in a bipolar lead acid battery.

At each end of the battery assembly is a monopole.

In order to seal the substrate for a bipolar electrode together with a frame for supporting a bipolar electrode for use in a bipolar battery, the substrate may be formed with a flange comprising a thermoplastic material. In one embodiment there is provided a substrate comprising at least a portion of thermoplastic material, or other component which will melt upon inductive heating to form a seal with a frame. The flange or portion of thermoplastic material may be designed such that it is of appropriate size and shape to interlock with the frame. The frame may also comprise thermoplastic material in an area in the vicinity of where the frame and substrate will meet in place in the bipolar battery. The inductive heating element may form an integral part of either the substrate or the frame element. Alternatively, or additionally, the inductive heating element may be a separate component which is placed between the substrate and the frame before inductive welding. Preferably the thermoplastic material is acrylonitrile butadiene (ABS).

Thermoplastic material, for example acrylonitrile butadiene (ABS), strips may be implanted around the edge, or near the edge of the substrates to a form continuous, or substantially continuous band of thermoplastic material.

The substrate for a bipolar battery as described herein is typically formed of mix of titanium suboxide particles (Ebonex™ particles) and resin. Such substrates and methods of forming them are well known in the art, see for example U.S. Pat. No. 4,422,917. It will also be understood that such substrates may be coated with a negative paste on one side of the electrode (typically porous lead), and/or a positive paste on the other side of the electrode (typically porous lead dioxide) for use in a bipolar lead acid battery. The substrate may be coated before it is welded into the frame, or afterwards.

Thus, the present invention includes sealing a substrate for a bipolar battery to a frame for supporting a bipolar electrode, where the substrate is at least partially coated with a negative and/or positive paste (typically known as a plate, or pasted substrate). Alternatively, the substrate may not be pasted.

The present invention will now be described further, by way of example only, with reference to the following drawings, in which:

FIG. 1: shows a diagram of an assembled battery, and a battery being formed using wires placed between each frame.

Figure 2:
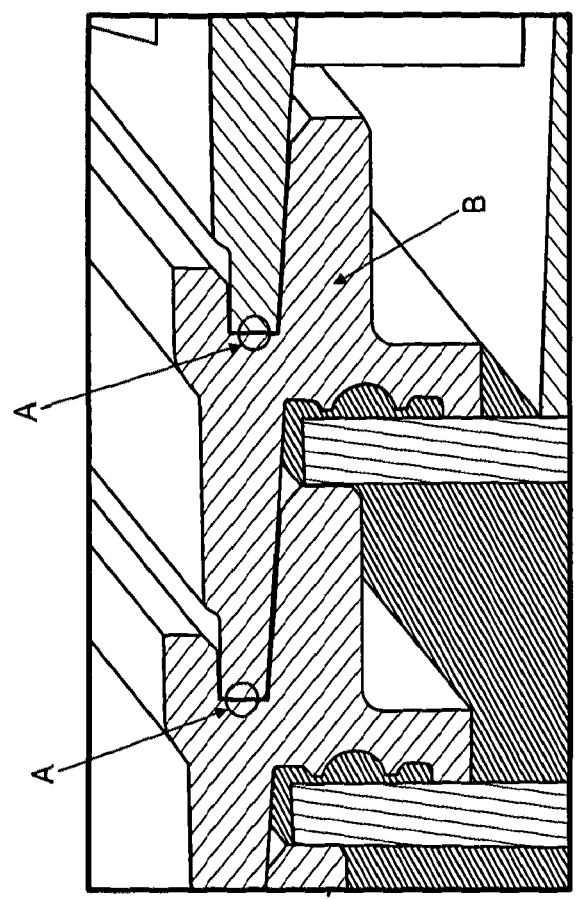
Figure 2:
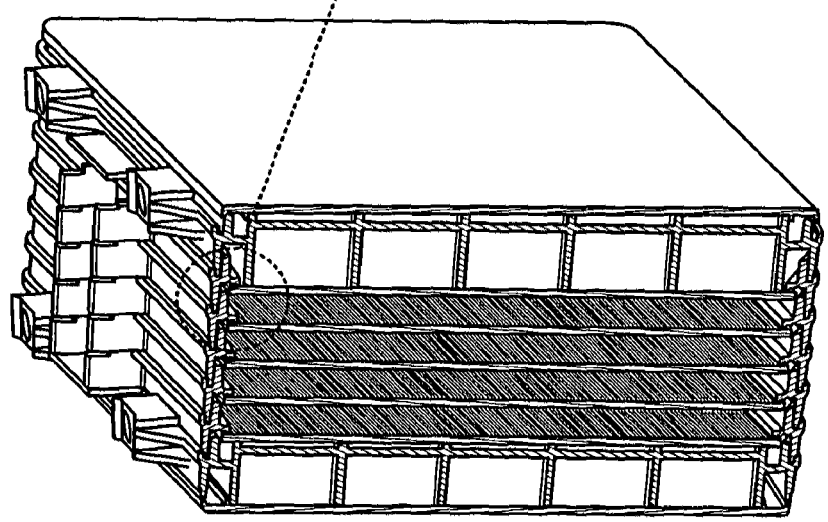

FIG. 2: shows a diagram showing the detailed cross section of the join of two frames comprising a wire as the inductive heating element. The diagram on the right hand side shows a detailed cross section of the join. A depicts the metal heating wires. B shows the tongue-in-groove joint.

Figure 3:
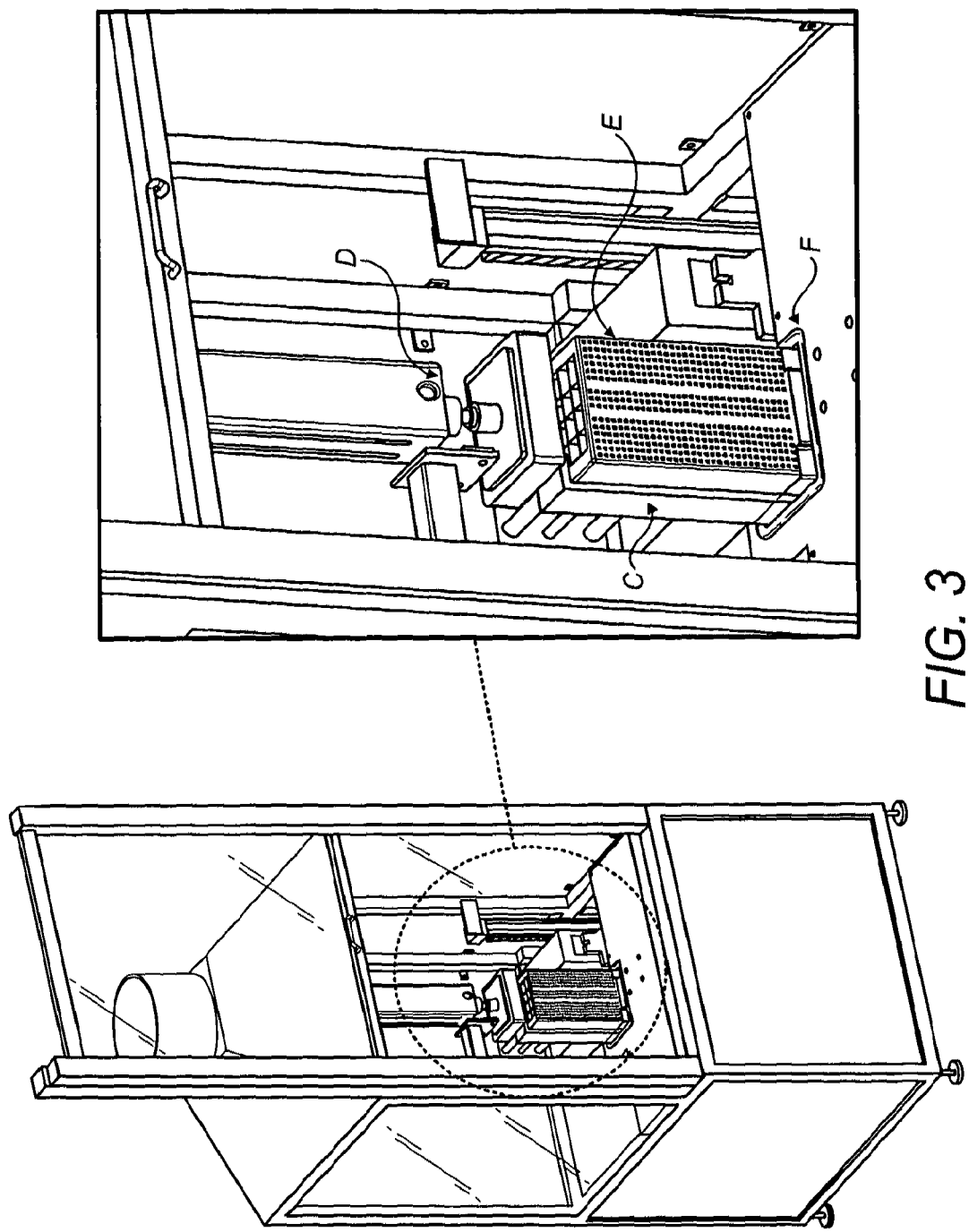

FIG. 3: shows a diagram of an induction sealing machine for frame to frame welding. C shows the alignment guide. D is the compression cylinder. E is a 48V battery stack. F is an induction coil.

Figure 4:
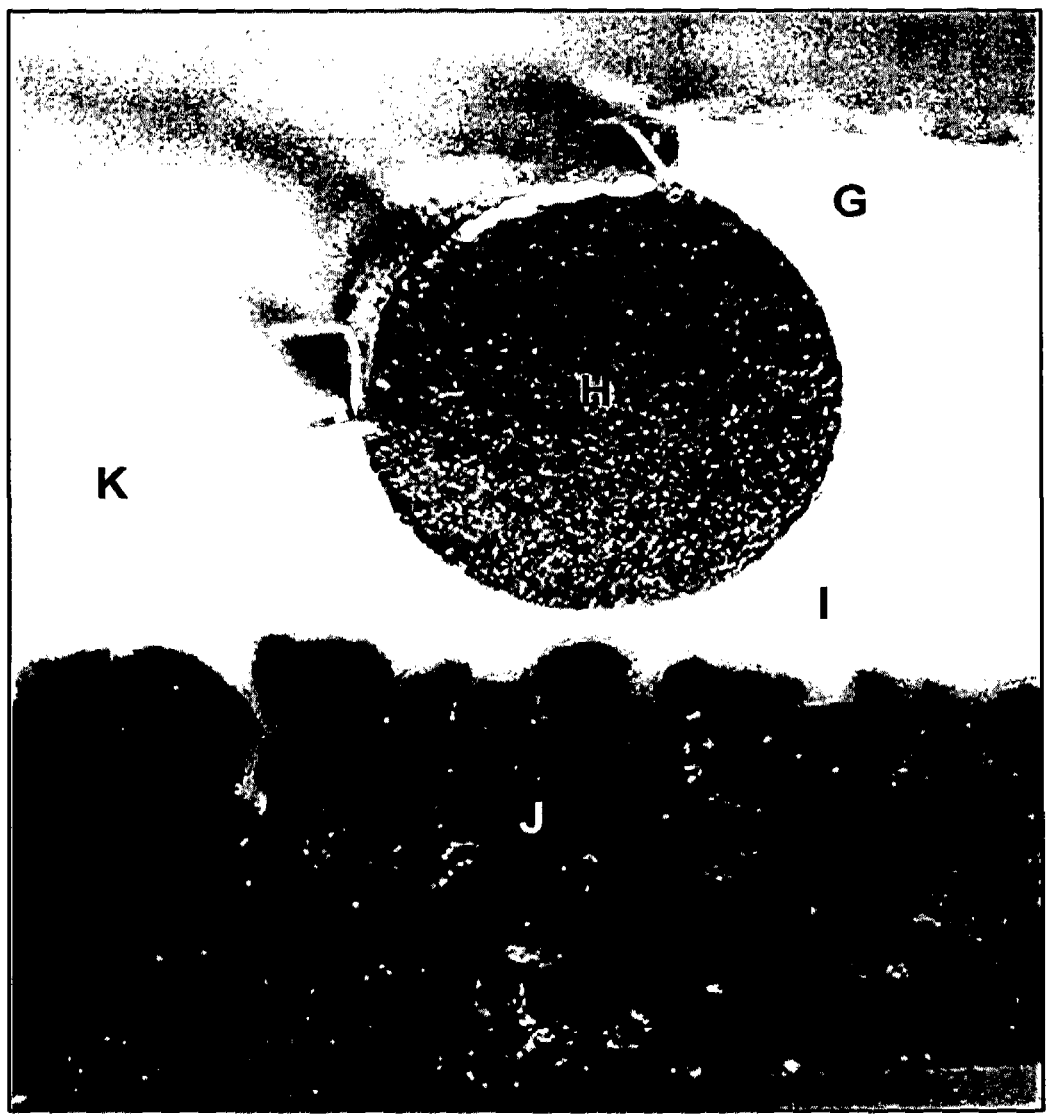

FIG. 4: shows is a photograph of the join created by induction welding of a frame and a substrate comprising a wire as the inductive heating element. G is a thermoplastic frame. H is an inductive element, for example a lead wire. I is a thermoplastic joint. J is the substrate. K is the thermoplastic portion of the substrate.

As shown in FIG. 3 the induction coil may be arranged such that on activating the generator a pre-installed program controls the coil movement. The coil may then travels up the battery or frame stack, passing the frames and, resulting in heat generation. This heat generation occurs because the coil becomes energised with a radio-frequency electric current which produces an electromagnetic field. The field's eddy currents act on the inductive heating element and due to resistance heat is generated. The result is that the heated inductive heating elements may cause the frame to frame join to become molten. The compressive force on the battery stack causes the molten plastic on each frame to fuse together. On cooling this produces a contained welded join and leak proof seal.

The invention claimed is:

1. A method of joining together two frames of a bipolar battery, the method comprising:
   interposing an inductive heating element between the two frames, wherein the frames are plastic frames which are supports for bipolar electrode substrates;
   applying a low frequency current of less than 275 kHz to the inductive heating element to generate localised heat to melt plastic material in the vicinity of the heating element to join the two frames together.

2. The method of claim 1 wherein the inductive heating element is a separate component from either of the two frames of the bipolar battery.

3. The method of claim 1 wherein the inductive heating element forms an integral part of at least one of the two frames of the bipolar battery.

4. The method of claim 1 wherein the inductive heating element comprises metal.

5. The method of claim 4 wherein the metal comprises a metal wire.

6. The method of claim 1 wherein the inductive heating element comprises plastic doped with ferromagnetic ceramic.

7. The method of claim 1 wherein the two frames have an interlocking configuration.

8. The method of claim 1 wherein the material which is melted by the inductive heating element is an integral part of at least one of the plastic frames of the bipolar battery.

9. The method of claim 1 wherein at least one of the frames of the bipolar battery to be joined together comprise thermoplastic material.

10. The method of claim 1 of joining together two frames of a bipolar battery, the method comprising:
   interposing the inductive heating element between the two frames, wherein the two frames have an interlocking configuration, and wherein the inductive heating element is a metal wire, flat metal strips, or doped polymer rope;
   applying said current under conditions of between 10 and 30 Amps and a frequency range of 100 to 275 kHz to the inductive heating element to generate localised heat to melt a thermoplastic material in the vicinity of the heating element to join the two frames together.

11. The method of claim 2 of scaling joining together two frames of a bipolar battery, the method comprising:
   interposing the inductive heating element between the two frames, wherein the two frames have an interlocking configuration, and wherein the inductive heating element is a metal wire, flat metal strips, or doped polymer rope;
   applying said current under conditions of between 10 and 30 Amps and a frequency range of 100 to 275 kHz to the inductive heating element to generate localised heat to melt a thermoplastic material in the vicinity of the heating element to join the two frames together.

12. The method of claim 8 wherein the material which is melted by the inductive heating element is a thermoplastic material.

13. The method of claim 1 wherein the material which is melted by the inductive heating element is a thermoplastic material which is separate from the two frames of the bipolar battery to be sealed together.

14. The method of claim 12 wherein the thermoplastic material is selected from the group consisting of acrylonitrile butadiene styrene, polyethylene, polypropylene, acrylonitrile butadiene styrene/polycarbonate and their blends.

15. The method of claim 13 wherein the thermoplastic material is selected from the group consisting of acrylonitrile butadiene styrene, polyethylene, polypropylene, acrylonitrile butadiene styrene/polycarbonate and their blends.

16. The method of claim 12 wherein the thermoplastic material is acrylonitrile butadiene styrene.

17. The method of claim 13 wherein the thermoplastic material is acrylonitrile butadiene styrene.

* * * * *